United States Patent
Hansen

(10) Patent No.: US 12,155,321 B1
(45) Date of Patent: Nov. 26, 2024

(54) AXIAL MOTOR USING WOBBLE PLATE AND ELECTROSTATIC ACTUATORS

(71) Applicant: The United States of America as represented by the Secretary of the Navy, Newport, RI (US)

(72) Inventor: Thomas E Hansen, Newport, RI (US)

(73) Assignee: The United States of America as represented by the Secretary of the Navy

( * ) Notice: Subject to any disclaimer, the term of this patent is extended or adjusted under 35 U.S.C. 154(b) by 330 days.

(21) Appl. No.: 17/950,318

(22) Filed: Sep. 22, 2022

(51) Int. Cl.
  *H02N 1/00* (2006.01)
  *H02K 7/00* (2006.01)

(52) U.S. Cl.
  CPC ............ *H02N 1/002* (2013.01); *H02K 7/003* (2013.01)

(58) Field of Classification Search
  CPC .............................. H02N 1/002; H02K 7/003
  See application file for complete search history.

(56) References Cited

U.S. PATENT DOCUMENTS

2002/0131679 A1* 9/2002 Nasiri .................. B81B 3/0062
  359/872
2006/0082251 A1* 4/2006 He ......................... H02N 1/006
  310/309
2011/0080627 A1* 4/2011 He ..................... G02B 26/0841
  359/224.1

FOREIGN PATENT DOCUMENTS

JP   H04112688 A * 4/1992

* cited by examiner

*Primary Examiner* — Mohamad A Musleh
(74) *Attorney, Agent, or Firm* — James M. Kasischke; Michael P. Stanley; Jeffry C. Severson

(57) ABSTRACT

An axial motor assembly is provided with fluidic electrostatic actuators mounted between an end plate and a wobble plate. A computer-implemented drive subsystem executes instructions to create voltage delivery patterns through a power supply to operate the actuators to create nutational motion in the wobble plate. A cam transfers the nutational motion into rotational motion and, in turn, into shaft power. The actuators can be linearly-contractile shelled electrostatic actuators, linearly expansive donut electrostatic actuators and multi-directionally expansive segmented donut electrostatic actuators. Drive method steps include initializing drive variables; determining, upon detecting a control command, a respective deformation target for each actuator; determining, based on the drive variables and the deformation targets, the voltage delivery pattern; and throttling the power supply to drive the actuators using the voltage delivery pattern. Upon detecting a response change in axial motor operation, drive variables can be dynamically recalibrated.

14 Claims, 10 Drawing Sheets

AXIAL MOTOR USING WOBBLE PLATE AND ELECTROSTATIC ACTUATORS

STATEMENT OF GOVERNMENT INTEREST

The invention described herein may be manufactured and used by or for the Government of the United States of America for governmental purposes without the payment of any royalties thereon or therefor.

The present application claims the benefit of United States Provisional Patent Application Ser. No. 63/391,811 filed on Jul. 25, 2022 with the invention entitled "Axial Motor Using Wobble Plate and Electrostatic Actuators" by the inventor, Thomas E. Hanson.

CROSS REFERENCE TO OTHER APPLICATIONS

None.

BACKGROUND OF THE INVENTION

(1) Field of the Invention

The present invention relates generally to motor technology and more particularly to low magnetic signature, low acoustic signature, high output motor design.

(2) Description of the Related Art

Small motor designs used in many naval applications, from thrusters to hand tools, not only deliver sufficient power based on the application but also must satisfy stringent requirements of minimal magnetic and acoustic signatures. Known motor designs that feature rotating components typically employ magnets to achieve required power, but often at the expense of a low magnetic field, acoustic radiation, and/or acoustic reflectivity.

Alternative motor design approaches that mimic biological actuation (e.g., force production from muscle-like structures assembled into multi-scale ensembles with integrated control systems) can improve power delivery, scalability, and efficiency. Electrostatic actuator design is a focus of this ongoing research.

Known electrostatic actuator designs commonly employ a dielectric material, preferably a fluid, positioned between electrodes that connect to a circuit. By applying a voltage to electrodes, the resultant electrostatic pressure deforms the dielectric material in a predetermined direction. The dielectric material returns to an original form when the circuit shorts.

Note that electrodes for electrostatic actuators deliver high voltages in excess of 1 kV at low currents which allows for thin, non-ferrous metallic electrodes to be used as well as non-metallic electrodes (for example carbon or hydrogel). These thin, flexible electrodes have low magnetic and acoustic signatures. The fluid dielectric material is transformer oil such as petroleum oil, silicone oil, fluoropolymer oil, natural ester, or similar, which does not contain metals or air, so the fluid dielectric material has low magnetic and acoustic signatures.

Electrostatic actuation can implement soft robotic systems that exploit highly compliant materials functionally similar to those found in living organisms. Various non-motor driven, pump-less, mechanisms for actuation exist, but each has drawbacks such as insufficient peak force, stroke, efficiency, speed, acoustic properties, magnetic properties, size, or durability.

While biologically-inspired motor designs employing electrostatic actuators have demonstrated advantages such as depth resilience, low noise, and actuation characteristics; combining electrostatic actuators with more powerful, non-biologically-inspired platforms (and, specifically, those used for rotational needs) remains an area of research interest.

BRIEF SUMMARY OF THE INVENTION

Accordingly, it is a primary object and general purpose of the present invention to provide an axial motor using a wobble plate driven by electrostatic actuator components.

The electrostatic actuators are fluidic electrostatic actuators such as linearly contractile shelled electrostatic actuators, linearly expansive donut electrostatic actuators and multi-directionally expansive segmented donut electrostatic actuators.

A voltage delivery pattern for electrostatic actuation includes a maximal voltage and a complementary minimal voltage received by pairing and mounting fluidic electrostatic actuators mounted at opposing positions on the wobble plate. When such voltages are delivered; the resultant voltage-mediated actuation (whether unidirectional in the case of linearly expansive/contractive electrostatic actuator types, or variable in the case of multi-directional expansive segmented electrostatic actuator types) creates a desired nutational motion of the wobble plate.

Another embodiment is directed to a method of operating an axial motor assembly. The method includes initializing drive variables including a delivery timing component and a voltage magnitude component for each of the fluidic electrostatic actuators; determining a deformation target for each electrostatic actuator; determining, based on drive variables and the deformation target for each fluidic electrostatic actuator, the voltage delivery pattern to include a respective voltage target for each electrostatic actuator; and throttling the power supply to drive the electrostatic actuators (and, therefore, the nutational motion in the wobble plate) by using the voltage delivery pattern. The method may further comprise recalibrating, upon detecting a response change in axial motor operation, at least one of the drive variables for the fluidic electrostatic actuators.

These and other objects, features, and advantages of the present invention will become more readily apparent from the attached drawings and the detailed description of the invention.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein.

DETAILED DESCRIPTION OF THE INVENTION

Embodiments of an axial motor characterized by low magnetic signature operation include a wobble plate and propulsive components in the form of fluidic electrostatic actuators capable of producing sufficient power and stroke to accommodate thrusters and tools.

Figure 1:
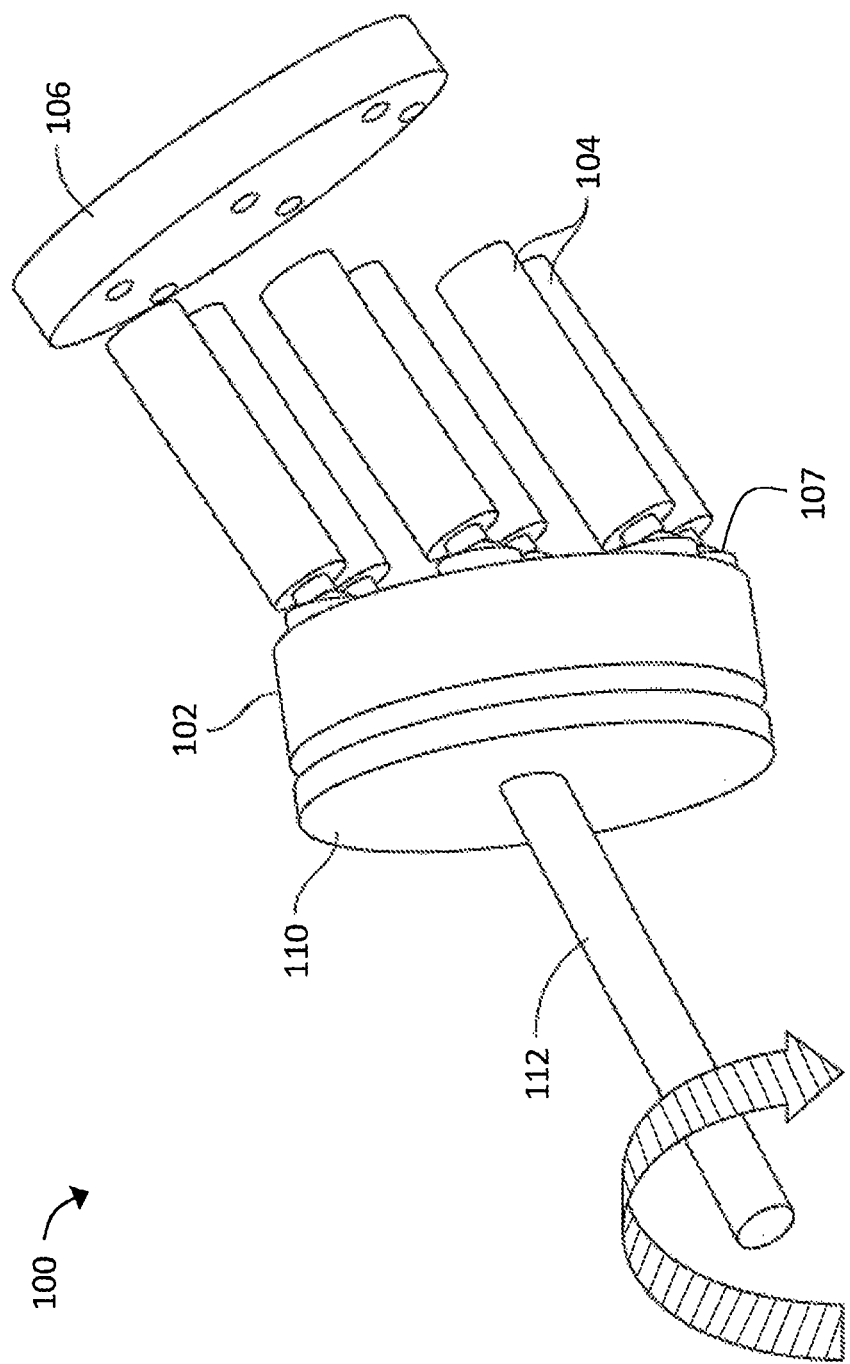
FIG. 1 depicts a rear perspective view of an exemplary wobble plate motor assembly known in the prior art.
Figure 2:
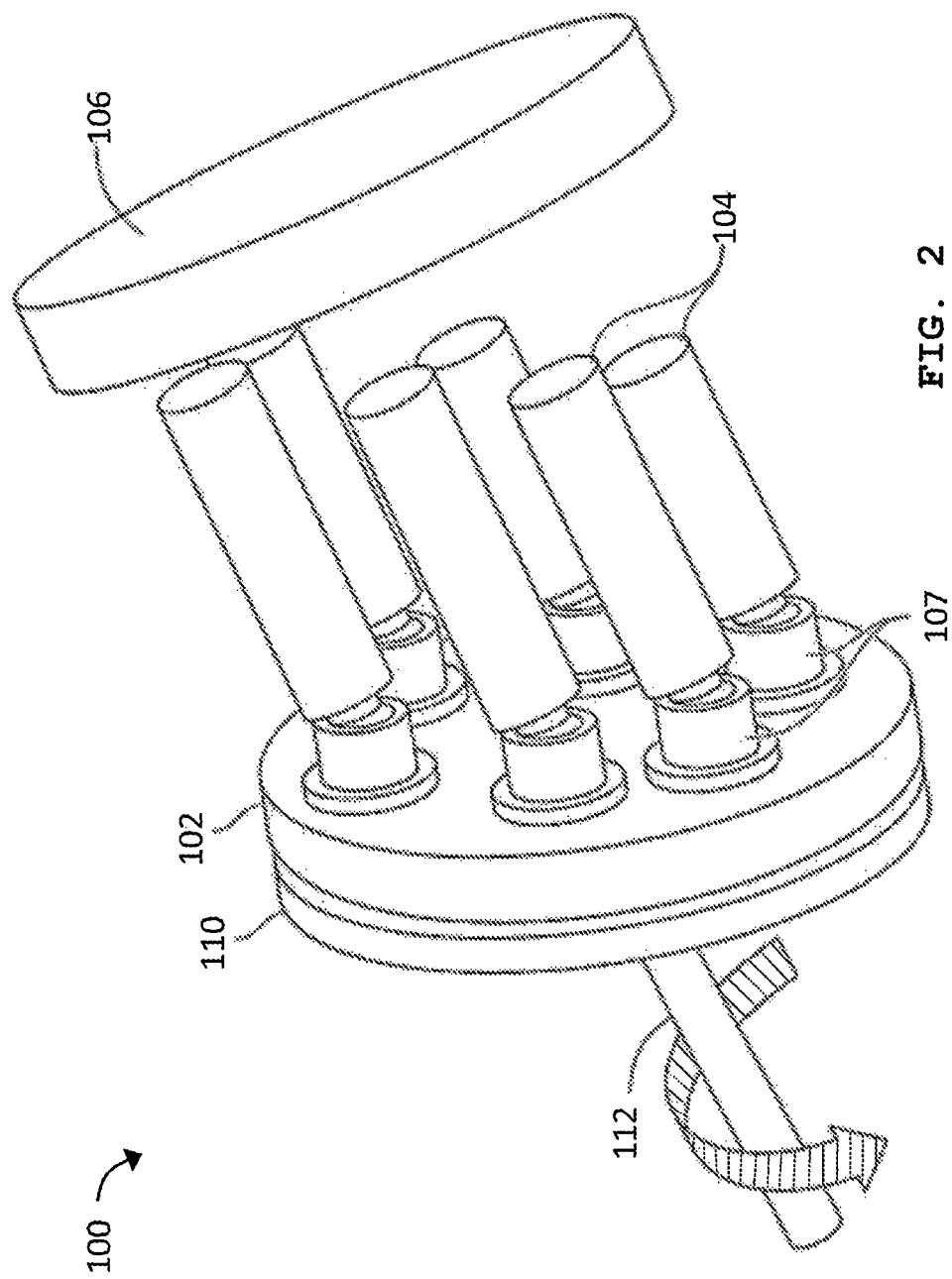
FIG. 2 depicts a front perspective view of the wobble plate motor assembly of FIG. 1.

FIG. 1 and FIG. 2 illustrate a prior art example of an axial motor design 100 having a wobble plate 102 hingedly attached to pistons 104. An end plate 106 includes propulsive components configured to manipulate the wobble plate 102 in a wobbling motion and in turn, moving the pistons 104 in an alternating axial direction. A surface of the wobble plate 102 opposite ball joints 107 makes unbonded, sliding contact with a responsive surface of a cam 110. The wobble plate 102 does not rotate, but instead nutational motion of the plate 102 transfers into rotational motion of a shaft 112 fixedly attached to the cam 110 opposite the responsive surface.

Embodiments of the present invention replace the pistons 104 and associated propulsive components of prior art FIG. 1 and FIG. 2 with electrostatic actuators. Fluidic electrostatic actuators work by zipping and bulging along a longitudinal axis of a pouch—as shown in the operational states 300 of FIG. 3.

Figure 3:
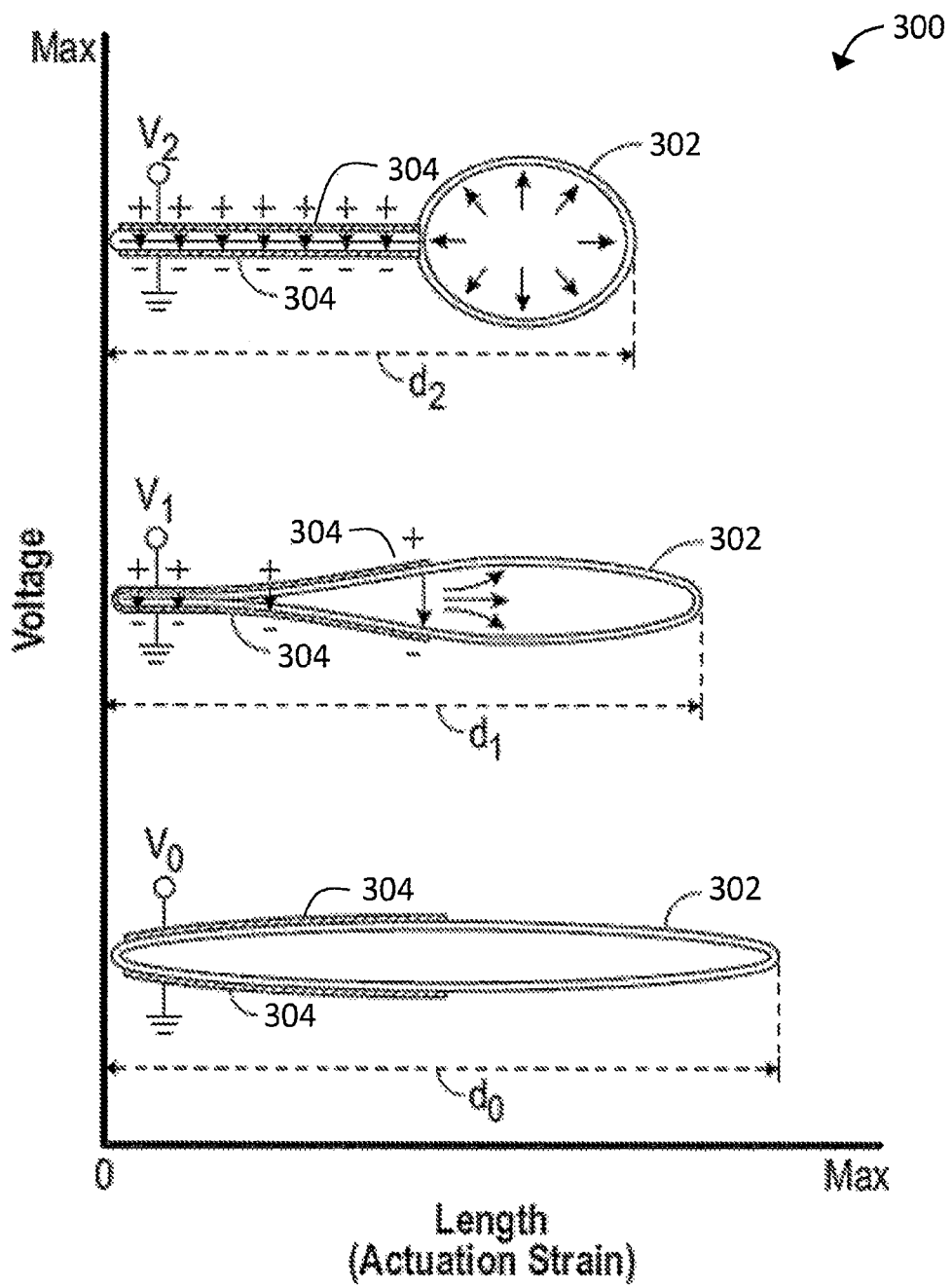
FIG. 3 depicts a schematic of fluidic electrostatic actuator operation according to a first embodiment of the present invention.

In FIG. 3, a sealed pouch 302 is filled with a fluidic electrostatic, and a pair of opposing electrodes 304 cover a portion on either side of the pouch. In a relaxed state with no voltage; the pouch 302 takes on a nominal length "do". Application of a voltage between the electrodes 304 results in an electric field that causes the electrodes to progressively zip together from the covered edge of the pouch 302 where the electrodes are closest and the resultant electric field is the highest.

With a zipping action, the electrodes 304 displace the fluidic electrostatic toward the region of the pouch 302 that is not covered by electrodes. The hydrostatic pressure inside the pouch 302 increases due to the inextensibility of the pouch and the incompressibility of the fluidic electrostatic; thereby, causing linear contraction of the pouch to an intermediate length "$d_1$" which is shorter than nominal length "$d_0$". The zipping process continues along the electrodes 304 as the voltage increases to ultimately displace the fluidic electrostatic away from the covering electrodes and into the pouch 302; thereby, contracting the pouch to the shortest length $d_2$.

Figure 4:
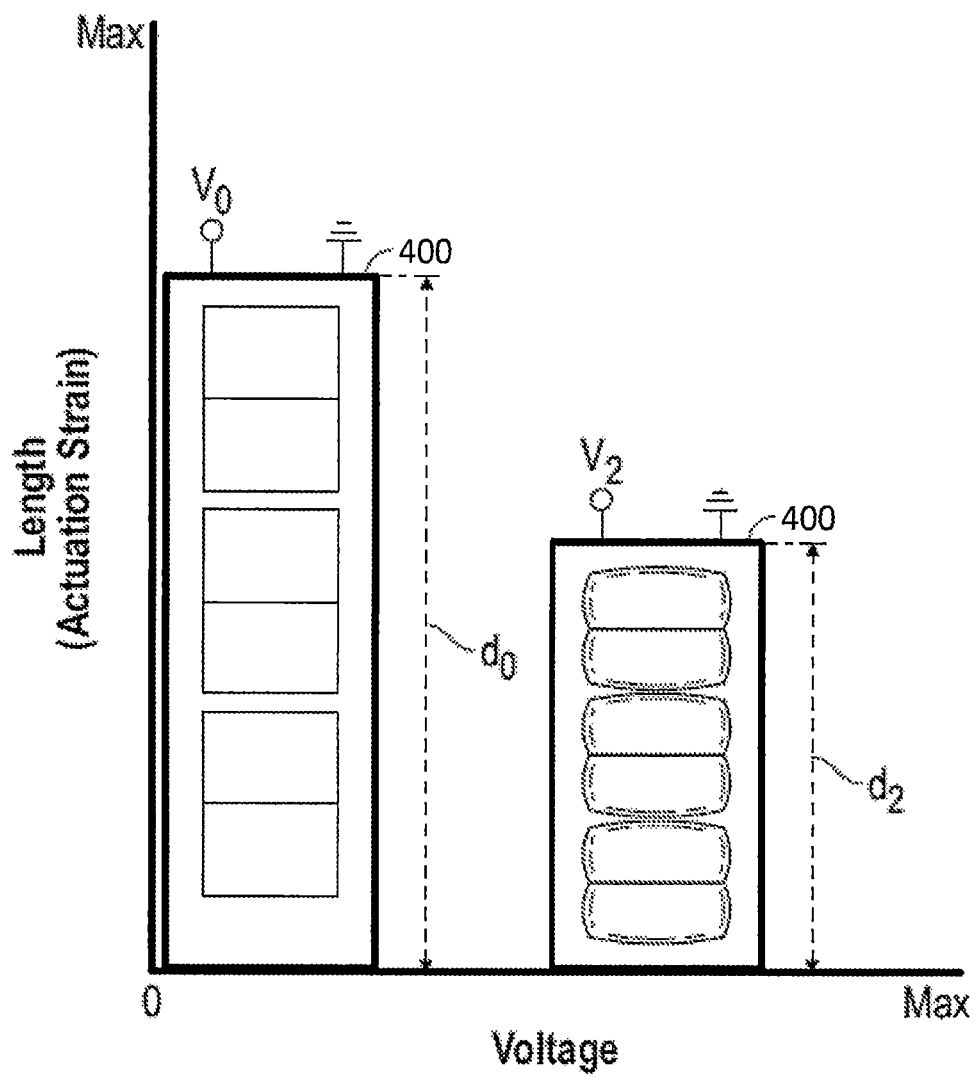
FIG. 4 depicts a schematic of a linearly contractile shelled electrostatic actuator employing the fluidic electrostatic actuator operation of FIG. 3.

The operation states of a linearly contractile electrostatic actuator 400 of FIG. 4 employ a variation of the operation states 300 of FIG. 3 to create directional force. The electrostatic actuator 400 includes substantially rectangular shells that are inextensible but flexible. Each of the shells is substantially filled with an electrostatic fluid with flexible electrodes positioned on both sides of each shell.

When there is no voltage $V_0$ applied to the electrostatic actuator 400; the electrostatic fluid disperses such that each shell substantially flattens to allow the actuator to relax to a full length "$d_0$". When a voltage $V_2$ is applied to the electrostatic actuator 400; the electrodes positioned about each shell zip together from the edges where the electric field is highest; thereby, displacing the electrostatic fluid and causing a respective region of each shell to take on a substantially cylindrical shape.

As a result of the voltage-driven deformation of shells, the electrostatic actuator 400 contracts to a length "$d_2$". The application of voltages of varying magnitude results in the electrostatic actuator contracting controllably to a length that enables voltage-mediated actuation.

Figure 5:
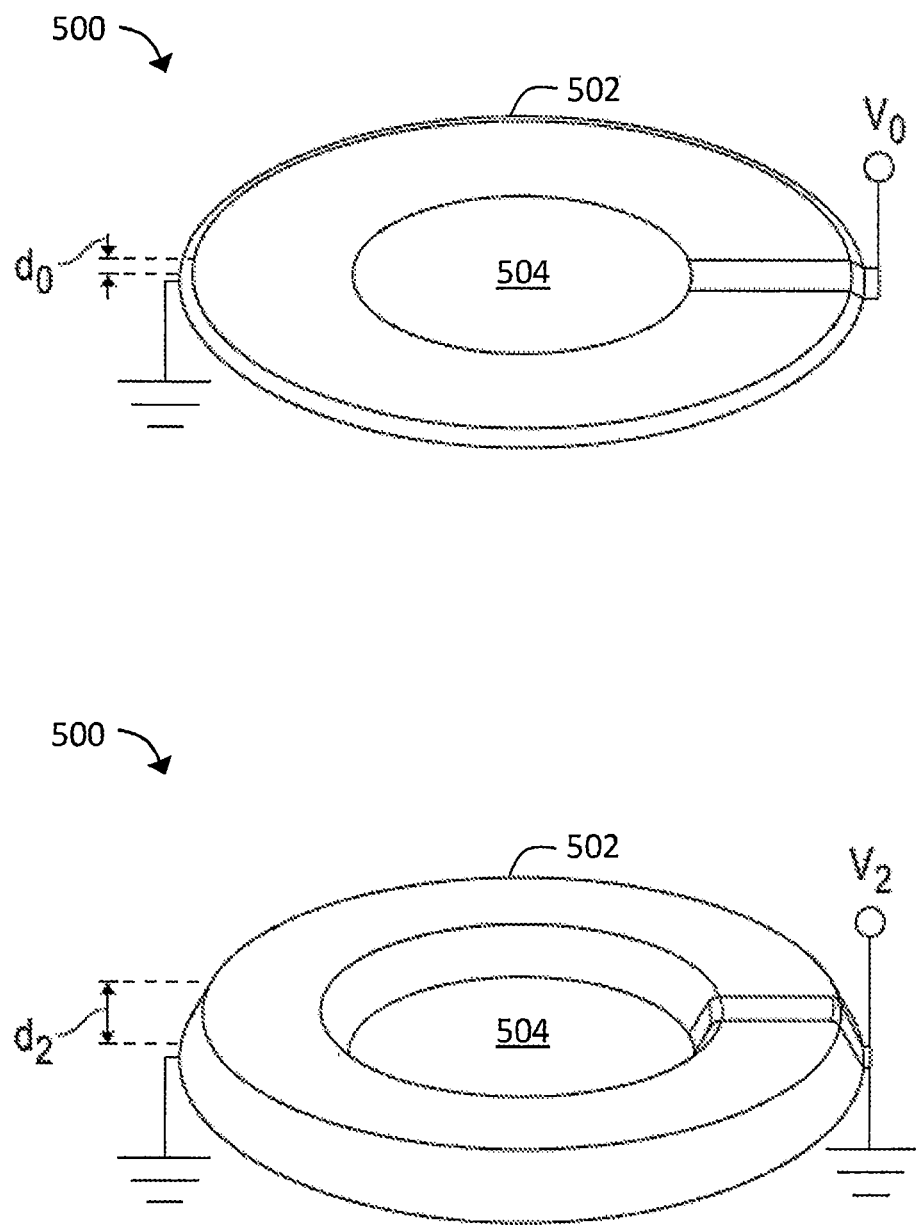
FIG. 5 depicts a schematic of a linearly expansive donut electrostatic actuator employing the fluidic electrostatic actuator operation of FIG. 3.

The operation states of a linearly expansive donut electrostatic actuator 500 of FIG. 5 employs a second variation of the operation states 300 of FIG. 3 to create directional force. The donut electrostatic actuator 500 includes a substantially circular, flexible pouch 502 filled with an electrostatic fluid and covered top and bottom with a pair of opposing and centrally positioned electrodes 504.

When no voltage is applied to the actuator 500; the electrostatic fluid disperses such that the pouch 502 substantially flattens to allow the actuator to relax to a shortest height "$d_0$". When a voltage is applied to the electrodes 504, a Maxwell stress acts on the pouch 502 and on the electrostatic fluid to cause local redistribution of the electrostatic fluid and a resultant change to the shape of the flexible pouch (e.g., when the voltage is applied to the actuator, the pouch deforms into a donut shape of a height "$d_2$").

Keeping with the principles of hydraulic amplification; changing the size of the electrode with respect to the size of the pouch modifies stroke and force output. Use of a large electrode results in larger actuation strain but lower force output; whereas, an actuator with small electrodes results in a smaller actuation strain but larger force output. Donut actuators can be stacked to increase an expansive actuation stroke.

For linearly contractile and linearly expansive electrostatic actuators; an activation voltage is required to create the directional force. The magnitude of the directional force depends on the actuator geometry, material and applied loads.

Figure 6:
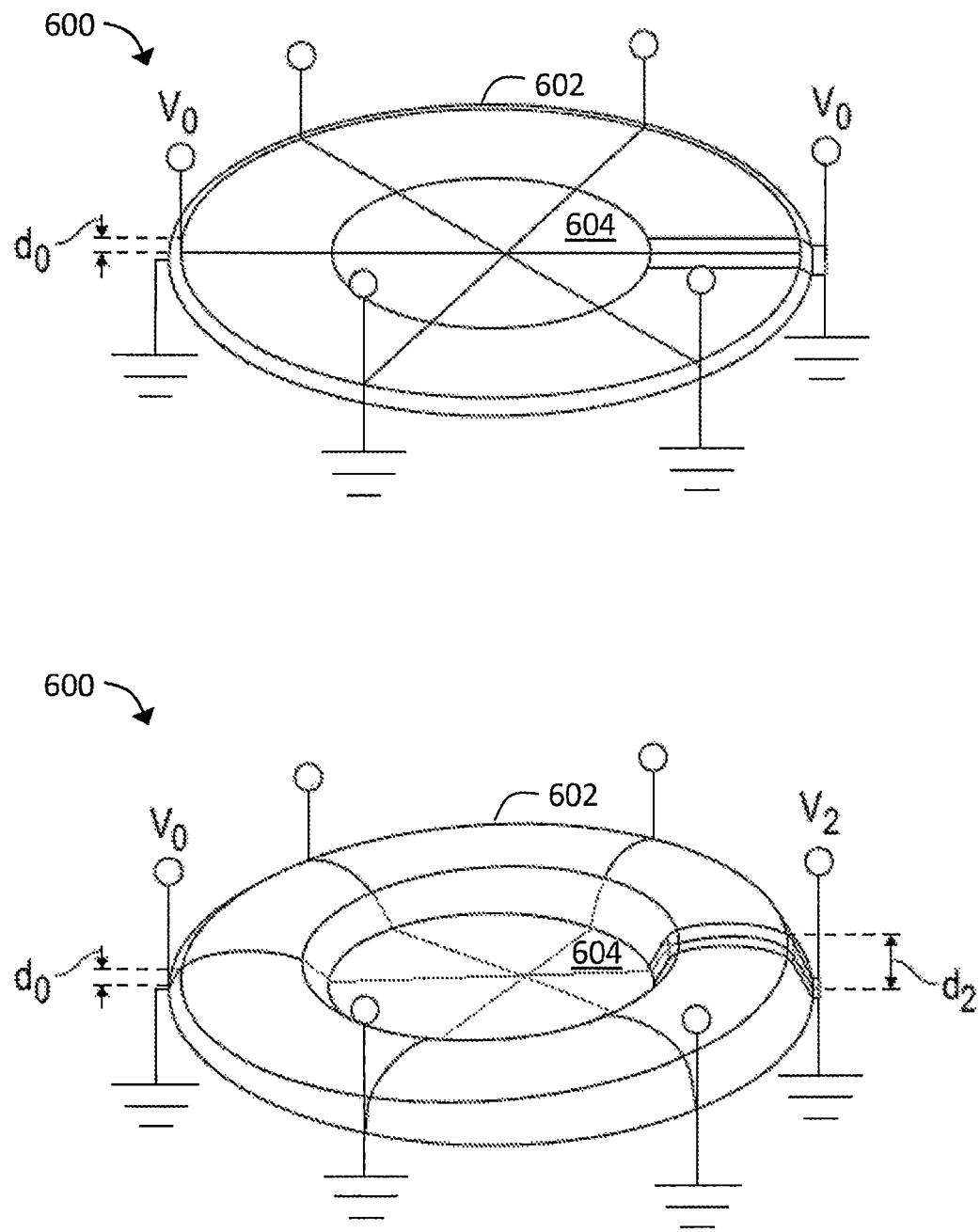
FIG. 6 depicts a schematic of a multi-directionally expansive segmented donut electrostatic actuator employing the fluidic electrostatic actuator operation of FIG. 3.

The operation states of a multi-directionally expansive segmented donut electrostatic actuator 600 of FIG. 6 employs yet another variation of the operation states' 300 of FIG. 3 to create directional force. The donut electrostatic actuator 600 includes a substantially circular thermoplastic shell 602 having a center defined by opposing (top and bottom) circular electrodes 604. The shell 602 and electrodes 604 are divided into discrete segments by heat sealing that prevents electrostatic fluid transfer between the segments.

Although the multi-directionally expansive segmented donut electrostatic actuator 600 is shown as subdivided into six equal segments; alternative segmentation schemes are within the scope of the present invention. When no voltage is applied to the actuator; the electrostatic fluid disperses such that the shell 602 substantially flattens to allow the actuator to relax to a shortest height "$d_0$".

When a voltage is applied to the segmented donut electrostatic actuator 600; the electrodes 602 in the associated segment progressively zip from the center of the shell 604 outward; thereby, causing the electrostatic fluid to deform to a height "$d_2$". By simultaneously operating the multiple segments of the shell 604 at varying voltages or even with no voltage; embodiments of the present invention are capable of multi-directional voltage-mediated actuation. Similar to the linearly expansive donut electrostatic actuator 500 of FIG. 5, stacking multi-directionally expansive segmented donut electrostatic actuators can increase actuation stroke.

Embodiments of the present invention employ wobble plate technology driven by electrostatic actuators to achieve an axial motor with a low magnetic signature. In such an axial motor design, each of the pistons 104 shown in FIG. 1 and FIG. 2 are replaced by linearly contractile shelled electrostatic actuators 702 or multi-directionally expansive segmented donut electrostatic actuators 802 that are capable of generating nutational motion of a wobble plate mechanism.

Figure 7:
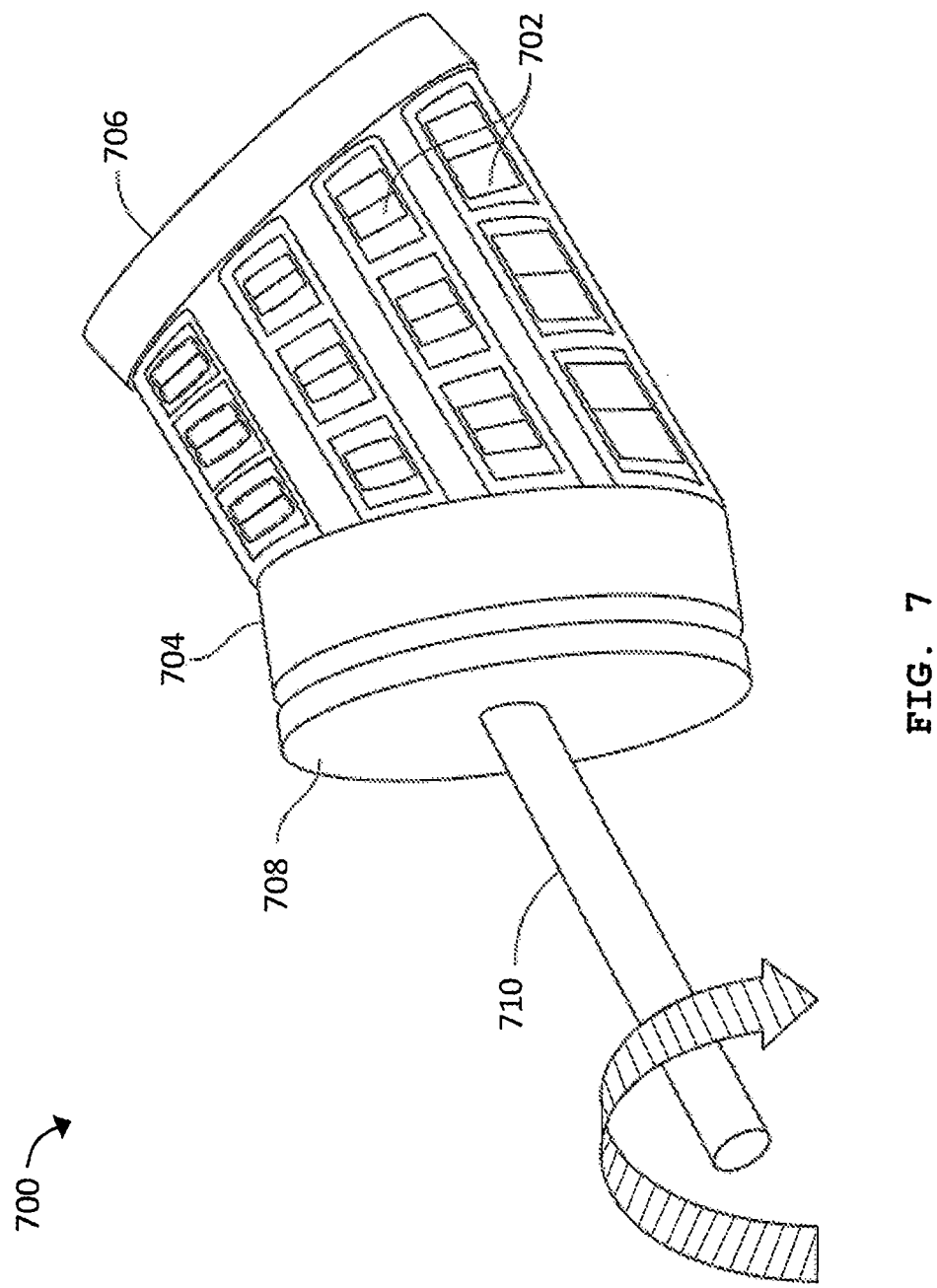
FIG. 7 depicts a rear perspective view of a first wobble plate motor assembly of the present invention employing linearly contractile shelled electrostatic actuators of FIG. 4.

Referring more specifically to a first axial motor assembly 700 of FIG. 7, linearly contractile shelled electrostatic actuators 702 attach at a first end to an inside perimeter of a wobble plate 704 and at a respective second end to an inside perimeter of an end plate 706. As previously described for the operating methodology of FIG. 4; voltage of controlled magnitude and timing is delivered to each of the linearly contractile shelled electrostatic actuators 702 to repeatedly contract and relax the actuators in an axial direction away from and back toward the end plate 706 to manipulate the wobble plate 704 in a nutational motion. A surface of the wobble plate 704 opposite the connection of the actuators 702 makes unbonded, sliding contact with a responsive surface of a cam 708. The nutational motion of the wobble plate 704 transfers into rotational motion of a shaft 710 fixedly attached to the cam 708 opposite the responsive surface.

A person of skill in the art will immediately recognize that a linearly expansive, non-segmented donut electrostatic actuator 500 (and/or respective columnal stacks of such actuators) may replace the linearly contractile shelled actuators 702 in the first axial motor assembly 700 of FIG. 7. Similar to the operating methodology of FIG. 4 (albeit with control sequencing reversed due to proactive expansion rather than proactive contraction of the employed actuators); voltage of controlled magnitude and timing is delivered to each of the linearly expansive donut electrostatic actuators 500. Doing so, may repeatedly contract and relax the actuators in an axial direction away from and back toward the end plate 706 to manipulate the wobble plate 704 in the nutational motion that transfers into rotational motion of the shaft 710 fixedly attached to the cam 708.

Figure 8:
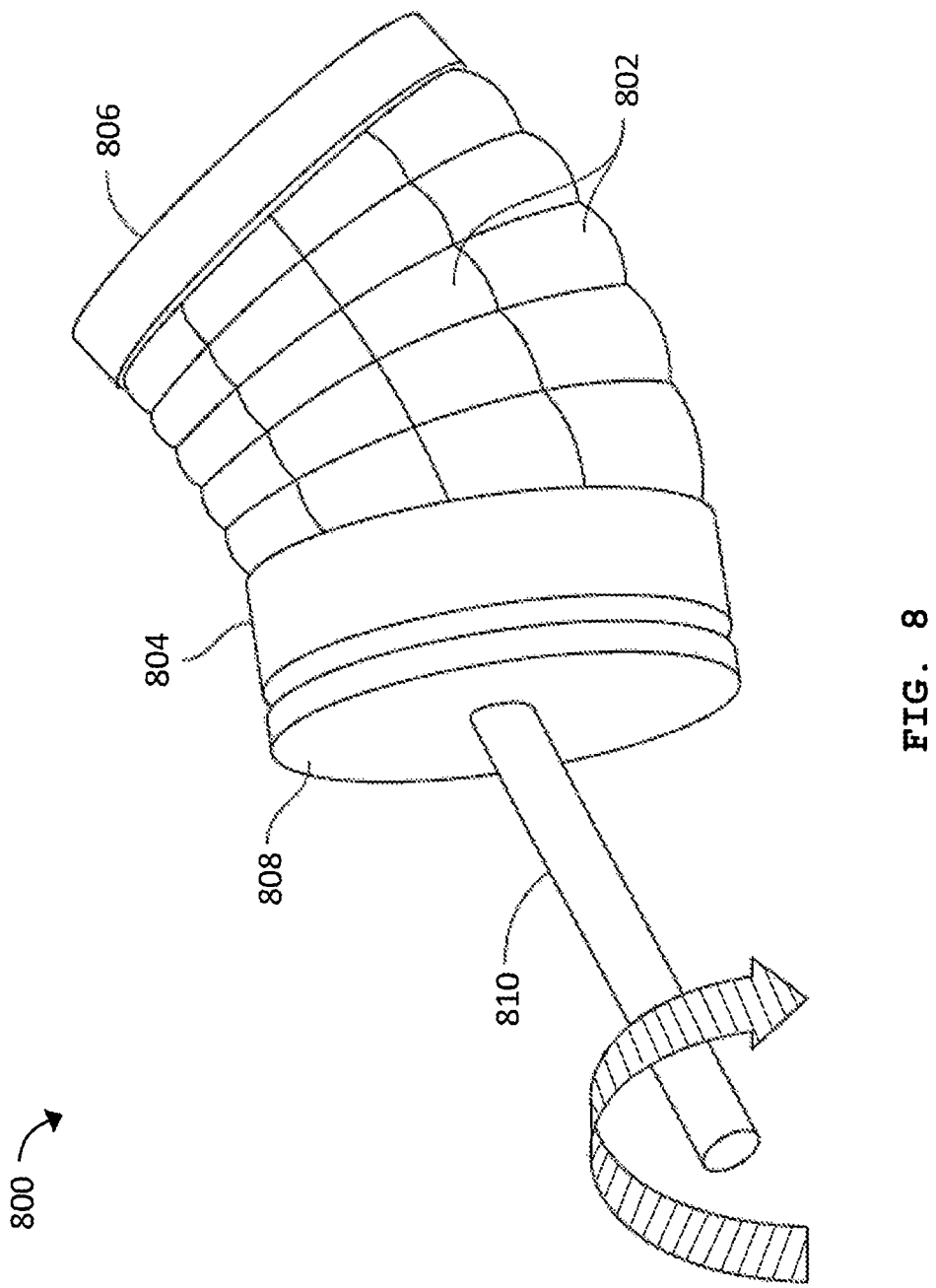
FIG. 8 depicts a rear perspective view of a second wobble plate motor assembly of the present invention employing the multi-directionally expansive segmented donut electrostatic actuators of FIG. 6.

Referring to a second axial motor assembly 800 of FIG. 8, multi-directionally extensive segmented donut electrostatic actuators 802 are stacked such that a first end of the stack is attached to a wobble plate mechanism 804 and a second end of the stack is attached to an end plate 806. As described for the operation state 600 of FIG. 6, voltage of controlled magnitude and timing is delivered to each of the segments of the multi-directionally extensive segmented donut electrostatic actuators. 802 to repeatedly expand and relax complementary segments of the stacked actuators in an axial direction away from and back toward the end plate 806 to manipulate the wobble plate 804 in a nutational motion.

A surface of the wobble plate 804 opposite the connection of the actuators 802 makes unbonded, sliding contact with a responsive surface of a cam 808. The nutational motion is transferred into rotational motion of a shaft 810 fixedly attached to the cam 808 opposite the responsive surface.

For the designs described for FIGS. 7 and 8, the axial motors can be implemented into a thruster or tool. Power supply for the actuators will require magnetic shielding. However, this requirement is not uncommon for small motors and is simple to achieve especially compared to shielding a rotating motor shaft.

Figure 9:
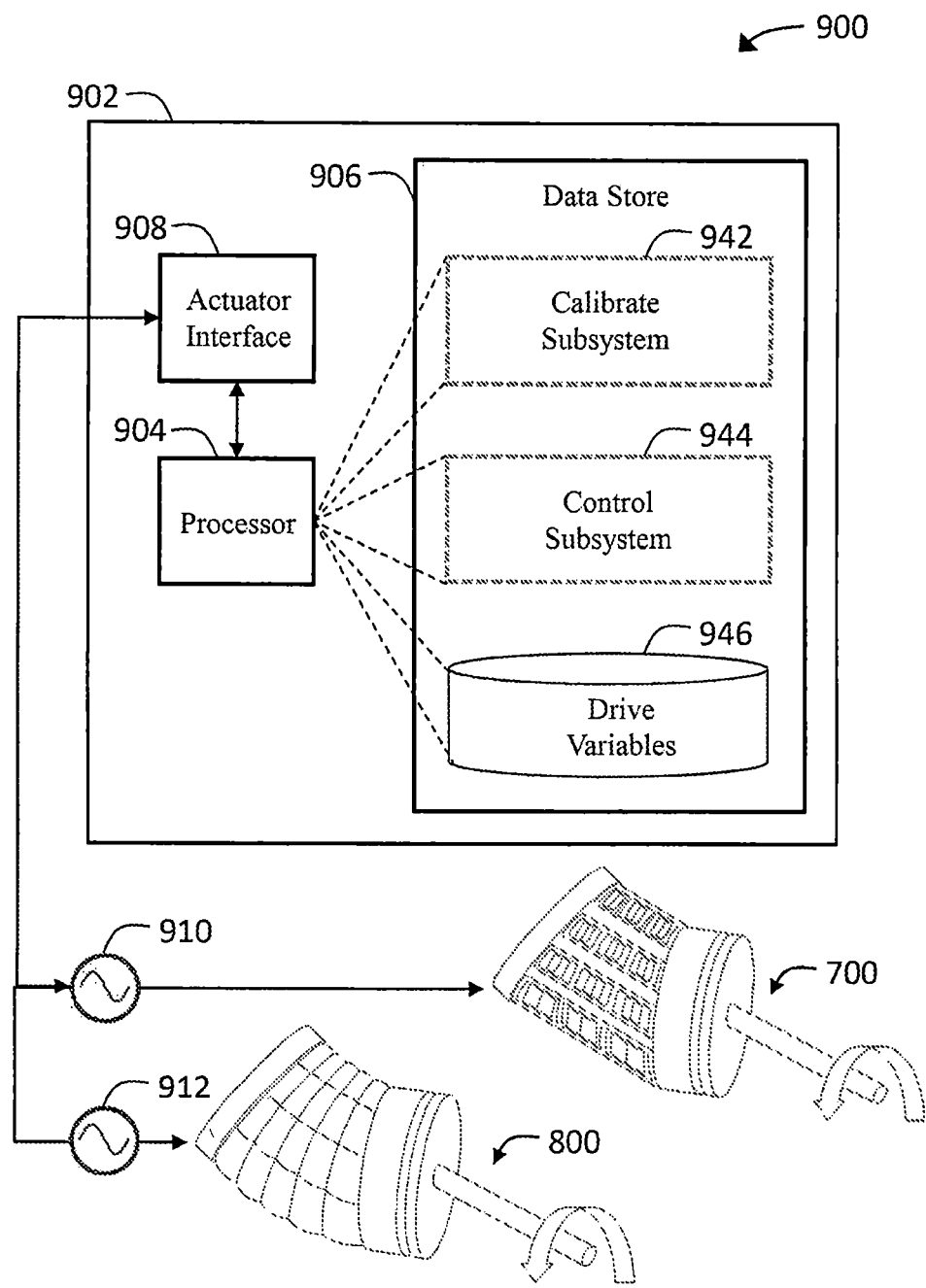
FIG. 9 depicts a schematic of a sensor drive system of the first and second wobble plate motor assemblies of FIGS. 7 and 8.

Referring now to FIG. 9, an electrostatic actuator drive subsystem 900 has a computing resource 902 with a processor 904 and a data store 908. The instructions of the drive subsystem 900 implement a calibrate subsystem 942, a control subsystem 944 and/or a drive variables database 946 in the data store 908. The instructions are retrievable by the processor 904.

The control subsystem 944 allows the processor 904 to operate an actuator interface 908 to transmit control signals (e.g., voltage triggers) to and/or receive operational data from the actuators of the axial motor mechanism (e.g., linearly contractile shelled electrostatic actuators 700 and/or expansive segmented donut actuators that may be multi-directional 800).

The calibrate subsystem 942 allows the processor 904 to record and retrieve axial motor operation data using the drive variables database 946 and to determine voltage delivery magnitude and timing for employed actuators in order to effect nutation of the wobble plate sufficient to produce a desired power through the shaft of the motor.

The control subsystem 944 can receive user commands, interpret drive variables, and deliver control signals through the actuator interface 908 to trigger voltage delivery from power sources 910, 912 to electrostatic actuators onboard the wobble plate motor assemblies 700, 800.

The electrostatic actuator drive subsystem 900 employs any or all of the calibrate subsystem 942, the control subsystem 944, and/or the drive variables database 946 collocated upon the host computing resource 902 or distributed among at least two host computing resources. The computing resource 902 and/or the power sources 910, 912 may be physically separated from (electrical communication componentry excepted) or carried by the wobble plate motor assemblies 700, 800 being driven by the electrostatic actuator drive subsystem 900.

The present disclosure uses computer instructions and/or system configurations that perform operations for driving electrostatic actuators. The instructions that include the calibrate subsystem 942, the control subsystem 944, and/or instructions of the drive variables database 946 are not meant to be limiting in any way.

For example, the processor 904 may be in data communication with external devices and configured to direct input from the external devices to the data store 906. Therefore, an additional subsystem(s) recorded to the data store 906 can enable the processor 904 to retrieve data from the data store 906 and to forward data as output to various networked components.

Figure 10:
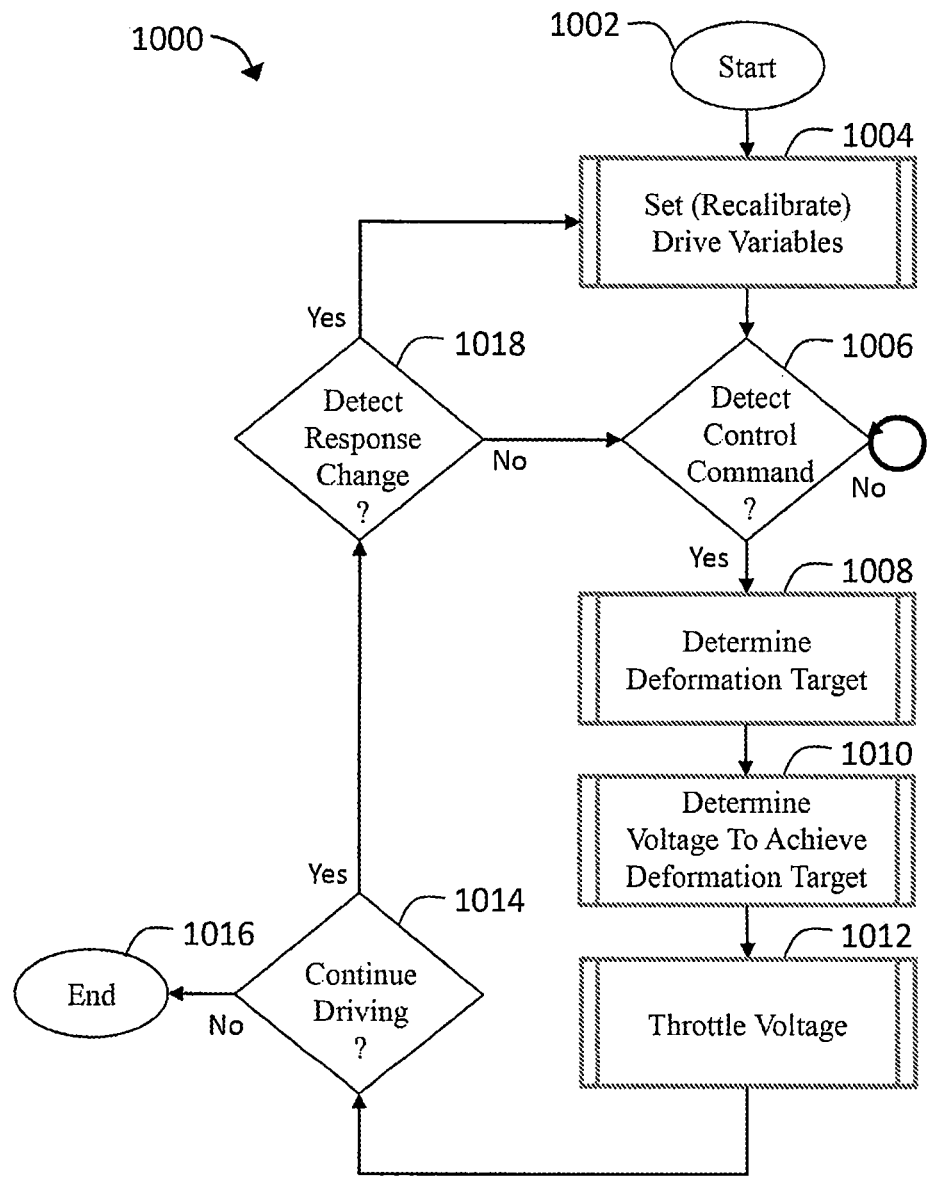
FIG. 10 depicts a flow chart of exemplary steps of an operation method for the sensor drive system of FIG. 9.

Referring now to FIG. 10, block diagram 1000 illustrates the operational sequence and use of computer-assisted aspects of the present invention. Starting at Block 1002, the electrostatic actuator drive subsystem 900 performs an initialization at Block 1004 of baseline drive values used in voltage delivery calculations (e.g., the magnitude and timing of respective voltages needed to drive each of the employed actuators to effect nutation of the wobble plate sufficient to produce a desired power through the shaft of the motor).

At Block 1006, the electrostatic actuator drive subsystem 900 detects a user command to control operation of the wobble plate motor assemblies 700, 800. The electrostatic actuator drive subsystem 900 can continue to loop (for example, leaving the wobble plate motor assemblies 700, 800 in a most recent operating state) until a subsequent control command is detected.

In Block 1008, the actuator drive subsystem 900 determines from the drive variables and from the received control command a deformation target for each of the actuators of the driven assembly 700, 800. At Block 1010, the electrostatic actuator drive subsystem 900 determines the magnitude and timing of respective voltages needed to achieve the respective deformation target for each of the employed actuators.

At Block 1012, the electrostatic actuator drive subsystem 900 uses the computed voltage characteristics to operate the power source 910, 912 to deliver the computed voltages to each of the employed actuators and to effect the nutation of the wobble plate of the driven assembly 700, 800.

At Block 1014 and if ongoing driving of the wobble plate motor assembly 700, 800 is required; the process may be repeated starting at the control command detection loop of Block 1006.

In certain embodiments of the present invention, changing motor performance characteristics are monitored at Block 1018 and, as needed, can trigger recalibration of drive variables at Block 1004 (e.g., to change the magnitude and timing of respective voltages needed to drive each of the employed actuators to effect nutation of the wobble plate in order to compensate for the changes in operating environment). If no response change is detected at Block 1018, then nominal operation (or the previous operating state) of the axial motor assembly 700, 800 may continue by control passing to the control command detection loop of Block 1006. If at Block 1014 continued driving of the segmented donut electrostatic is not required, operation of the electrostatic actuator drive system ends at Block 1016.

Embodiments of the axial motor design of the present invention provide a low magnetic signature and high power output using fluid electrostatic actuators to drive a wobble plate type mechanism; therefore, converting linear motion into a rotation that minimizes required space and torque experienced by the motor body. To assist in the operation of the axial motor; the actuator displacement can be measured in real-time by capacitance.

Devices in which this axial motor design may be deployed include thrusters (such as diver propulsion vehicles) and tools (such as chisels, cutters, brushes, and drills). Because fluidic electrostatic actuators are pressure agnostic, the described axial motors have the potential to work at numerous depths without seals or pressure compensation. Another advantage to the axial motor design described is a low/alternate acoustic signature in contrast to existing systems.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. An axial motor assembly, comprising:
   a wobble plate;
   an end plate; and
   a plurality of fluidic electrostatic actuators mechanically mounted at a first end to a face of said end plate and at a second end to a first face of said wobble plate with said plurality of fluidic electrostatic actuators configured to create nutational motion in said wobble plate based on a voltage delivery pattern.

2. The axial motor assembly in accordance with claim 1, further comprising:
   a cam positioned in unbonded contact with said wobble plate and configured to transfer the nutational motion into a rotational motion of said cam; and
   a shaft fixedly attached to said cam and configured to transfer power from the rotational motion of said cam.

3. The axial motor assembly in accordance with claim 2, wherein said plurality of fluidic electrostatic actuators is at least one of a linearly contractile shelled electrostatic actuator type and a linearly expansive donut electrostatic actuator type; and
   wherein the voltage delivery pattern is a maximal voltage received by a first of said plurality of fluidic electrostatic actuators mounted to a first position on said wobble plate, and a minimal voltage received by a second of said plurality of fluidic electrostatic actuators mounted to a second position substantially opposite the first position on said wobble plate.

4. The axial motor assembly in accordance with claim 2, wherein said plurality of fluidic electrostatic actuators is of a multi-directionally expansive segmented donut electrostatic actuator type; and,
   wherein the voltage delivery pattern comprises a maximal voltage received by a first segment of one of said plurality of fluidic electrostatic actuators, defined as a stack base actuator, positioned adjacent a first position on said wobble plate, and a minimal voltage received by a second segment of said stack base actuator positioned adjacent a second position substantially opposite the first position on said wobble plate.

5. An axial motor system, comprising:
   a wobble plate;
   an end plate;
   a power supply;
   a computer-implemented electrostatic actuator drive subsystem of at least one processor configured with executable instructions to create a voltage delivery pattern using said power supply; and
   a plurality of fluidic electrostatic actuators mechanically mounted at a first end to said end plate and at a second end to said wobble plate, and configured to create nutational motion in said wobble plate based on the voltage delivery pattern.

6. The axial motor system in accordance with claim 5, further comprising:
   a cam positioned in unbonded contact with said wobble plate and configured to transfer the nutational motion into a rotational motion of said cam; and
   a shaft fixedly attached to said cam and configured to transfer power from the rotational motion of said cam.

7. The axial motor system in accordance with claim 6, wherein said plurality of fluidic electrostatic actuators comprises at least one of a linearly contractile shelled electrostatic actuator and a linearly expansive donut electrostatic actuator.

8. The axial motor system in accordance with claim 7, wherein the voltage delivery pattern comprises a maximal voltage received by a first of said plurality of fluidic electrostatic actuators mounted to a first position on said wobble plate, and a minimal voltage received by a second of said plurality of fluidic electrostatic actuators mounted to a second position substantially opposite the first position on said wobble plate.

9. The axial motor system in accordance with claim 5, wherein said plurality of fluidic electrostatic actuators comprises at least one multi-directionally expansive segmented donut electrostatic actuator; and wherein the voltage delivery pattern comprises a maximal voltage received by a first segment of said at least one multi-directionally expansive segmented donut electrostatic actuator positioned adjacent a first position on said wobble plate, and a minimal voltage received by a second segment of said at least one multi-directionally expansive segmented donut electrostatic actuator positioned adjacent a second position substantially opposite the first position on said wobble plate.

10. The axial motor system in accordance with claim 9, wherein the voltage delivery pattern comprises a respective pairing of a delivery timing component and a voltage magnitude component for each of said plurality of fluidic electrostatic actuators.

11. A computer-implemented method of operating an axial motor having a wobble plate, an end plate, a power supply, and a plurality of fluidic electrostatic actuators mechanically mounted at a first end to a face of the end plate and at a second end to a first face of the wobble plate and at least one operationally-connected processor configured with executable instructions to perform the method steps of:

initializing a plurality of drive variables comprising a delivery timing component and a voltage magnitude component for each of the plurality of fluidic electrostatic actuators;

determining, upon detecting a control command, a respective deformation target for each of the plurality of fluidic electrostatic actuators;

determining, based on the drive variables and the respective deformation target for each of the plurality of fluidic electrostatic actuators, a respective voltage target for each of the plurality of fluidic electrostatic actuators, to define a voltage delivery pattern;

determining, based upon a measured capacitance for each of the plurality of fluidic electrostatic actuators, a respective actuator displacement; and throttling the power supply to drive the plurality of fluidic electrostatic actuators using the voltage delivery pattern and the plurality of actuator displacements.

12. The computer-implemented method in accordance with claim 11, wherein said throttling of the power supply step further comprises creating, using the plurality of fluidic electrostatic actuators receiving the voltage delivery pattern, a nutational motion in the wobble plate.

13. The computer-implemented method in accordance with claim 12, wherein said throttling of the power supply further comprises transferring the nutational motion in the wobble plate into a rotational motion of a shaft.

14. The computer-implemented method in accordance with claim 13, said method further comprising the steps of:

detecting a response change; and calibrating subsequent to said detection step, at least one of the plurality of drive variables for the plurality of fluidic electrostatic actuators.

\* \* \* \* \*